United States Patent
Darr et al.

(10) Patent No.: US 12,017,816 B2
(45) Date of Patent: *Jun. 25, 2024

(54) LIGHTWEIGHT PLASTIC CONTAINER AND PREFORM

(71) Applicant: Plastipak Packaging, Inc., Plymouth, MI (US)

(72) Inventors: Richard C. Darr, Medina, OH (US); Edward V. Morgan, Northville, MI (US)

(73) Assignee: Plastipak Packaging, Inc., Plymouth, MI (US)

( * ) Notice: Subject to any disclaimer, the term of this patent is extended or adjusted under 35 U.S.C. 154(b) by 6 days.

This patent is subject to a terminal disclaimer.

(21) Appl. No.: 18/377,501

(22) Filed: Oct. 6, 2023

(65) Prior Publication Data

US 2024/0034508 A1 Feb. 1, 2024

Related U.S. Application Data

(60) Continuation of application No. 18/099,446, filed on Jan. 20, 2023, now Pat. No. 11,834,222, which is a (Continued)

(51) Int. Cl.
 B65D 1/02 (2006.01)
 B29B 11/08 (2006.01)
 (Continued)

(52) U.S. Cl.
 CPC ............ B65D 1/0246 (2013.01); B29B 11/14 (2013.01); B29C 48/141 (2019.02);
 (Continued)

(58) Field of Classification Search
 CPC .... B65D 1/0246; B65D 1/0207; B65D 1/023; B65D 1/0284; B65D 1/40; B65D 1/44; B65D 1/46; B29B 11/14; B29B 11/08
 See application file for complete search history.

(56) References Cited

U.S. PATENT DOCUMENTS

| 198,528 A | 12/1877 | Woodward |
|---|---|---|
| 2,367,317 A | 1/1945 | Thomas |

(Continued)

FOREIGN PATENT DOCUMENTS

| DE | 2638351 | 12/1977 |
|---|---|---|
| DE | 2814952 | 10/1978 |

(Continued)

OTHER PUBLICATIONS

[No Author Listed], "28mm Carbonated Soft Drink (CSD), 38mm Carbonated Soft Drink (CSD)," 1 page (publication date, if any, unknown).

(Continued)

*Primary Examiner* — Michael C Miggins
(74) *Attorney, Agent, or Firm* — Fishman Stewart PLLC

(57) ABSTRACT

A plastic preform includes a hollow body portion including a closed base portion and a lower portion and a lower portion extending upwardly from the closed bottom portion; and a neck portion extending upwardly from the lower portion. The neck portion includes a dispensing opening positioned at a top of the neck portion, threads positioned below the dispensing opening, a tamper-evident formation having a lower surface and positioned directly below the threads, and a support flange having an upper surface and a lower surface and positioned below the tamper-evident formation. In an embodiment, the plastic preform is formed of a material comprising polyethylene terephthalate (PET), and a vertical distance from the lower surface of the tamper-evident formation to the lower surface of the support flange is from 0.125 to 0.150 inches. Containers and methods for molding preforms and making containers are also disclosed.

24 Claims, 3 Drawing Sheets

Related U.S. Application Data continuation of application No. 17/314,721, filed on May 7, 2021, now Pat. No. 11,560,250, which is a continuation of application No. 16/598,452, filed on Oct. 10, 2019, now abandoned, which is a continuation of application No. 16/013,139, filed on Jun. 20, 2018, now Pat. No. 10,457,437, which is a continuation of application No. 16/012,302, filed on Jun. 19, 2018, now Pat. No. 10,266,299, which is a continuation of application No. 15/495,084, filed on Apr. 24, 2017, now Pat. No. 10,023,345, which is a continuation of application No. 15/404,731, filed on Jan. 12, 2017, now Pat. No. 9,738,409, which is a continuation of application No. 15/383,179, filed on Dec. 19, 2016, now Pat. No. 9,850,019, which is a continuation of application No. 15/220,731, filed on Jul. 27, 2016, now Pat. No. 9,522,759, which is a continuation of application No. 14/803,505, filed on Jul. 20, 2015, now Pat. No. 9,403,310, which is a continuation of application No. 14/688,734, filed on Apr. 16, 2015, now Pat. No. 9,139,326, which is a continuation of application No. 14/511,848, filed on Oct. 10, 2014, now Pat. No. 9,033,168, which is a division of application No. 11/749,501, filed on May 16, 2007, now Pat. No. 8,857,637, which is a continuation-in-part of application No. 11/368,860, filed on Mar. 6, 2006, now Pat. No. 7,708,159.

(51) Int. Cl.
| | |
|---|---|
| *B29B 11/14* | (2006.01) |
| *B29C 48/14* | (2019.01) |
| *B29C 49/00* | (2006.01) |
| *B29C 49/06* | (2006.01) |
| *B29C 49/08* | (2006.01) |
| *B29C 49/46* | (2006.01) |
| *B29K 67/00* | (2006.01) |
| *B29K 105/00* | (2006.01) |
| *B29K 105/26* | (2006.01) |
| *B29L 31/00* | (2006.01) |
| *B65D 1/40* | (2006.01) |
| *B65D 1/44* | (2006.01) |
| *B65D 1/46* | (2006.01) |
| *B65D 43/02* | (2006.01) |

(52) U.S. Cl.
CPC ............ *B29C 49/071* (2022.05); *B29C 49/46* (2013.01); *B65D 1/0207* (2013.01); *B65D 1/023* (2013.01); *B65D 1/0284* (2013.01); *B65D 1/40* (2013.01); *B65D 1/44* (2013.01); *B65D 1/46* (2013.01); *B65D 43/0235* (2013.01); *B29B 11/08* (2013.01); *B29C 49/06* (2013.01); *B29C 49/08* (2013.01); *B29C 2049/4664* (2013.01); *B29C 2949/072* (2022.05); *B29C 2949/073* (2022.05); *B29C 2949/074* (2022.05); *B29C 2949/0773* (2022.05); *B29C 2949/0774* (2022.05); *B29C 2949/0777* (2022.05); *B29C 2949/0812* (2022.05); *B29C 2949/0816* (2022.05); *B29C 2949/0821* (2022.05); *B29C 2949/0822* (2022.05); *B29C 2949/0825* (2022.05); *B29C 2949/0829* (2022.05); *B29C 2949/0831* (2022.05); *B29C 2949/0834* (2022.05); *B29C 2949/0872* (2022.05); *B29K 2067/00* (2013.01); *B29K 2067/003* (2013.01); *B29K 2105/258* (2013.01); *B29K 2105/26* (2013.01); *B29L 2031/7158* (2013.01); *Y10T 428/1352* (2015.01); *Y10T 428/1397* (2015.01)

(56) References Cited

U.S. PATENT DOCUMENTS

| | | |
|---|---|---|
| 2,914,206 A | 11/1959 | Lowen |
| 3,235,115 A | 2/1966 | Duke |
| 3,398,427 A | 8/1968 | John |
| 3,470,282 A | 9/1969 | Scalora |
| 3,559,833 A | 2/1971 | Alonso |
| 3,598,270 A | 8/1971 | Adomaitis |
| 3,733,309 A | 5/1973 | Wyeth et al. |
| 3,774,795 A | 11/1973 | Leenaards |
| 3,830,893 A | 8/1974 | Steingiser |
| 3,881,622 A | 5/1975 | Dockery |
| 4,098,419 A | 7/1978 | Virog, Jr. et al. |
| 4,117,050 A | 9/1978 | Appel et al. |
| 4,126,658 A | 11/1978 | Rupert et al. |
| 4,156,490 A | 5/1979 | Peraboni |
| 4,177,906 A | 12/1979 | Von Hagel |
| 4,180,175 A | 12/1979 | Virog, Jr. et al. |
| 4,301,937 A | 11/1981 | Von Hagel |
| 4,307,137 A | 12/1981 | Ota et al. |
| 4,342,395 A | 8/1982 | Brown |
| 4,342,398 A | 8/1982 | Chang |
| 4,401,227 A | 8/1983 | Pehr |
| 4,463,056 A | 7/1984 | Steele |
| 4,469,234 A | 9/1984 | Deussen |
| 4,534,930 A | 8/1985 | Nohara |
| 4,541,536 A | 9/1985 | Davis et al. |
| 4,573,599 A | 3/1986 | Fillmore |
| 4,606,723 A | 8/1986 | Pasternicki |
| 4,615,667 A | 10/1986 | Roy |
| 4,715,504 A | 12/1987 | Chang et al. |
| 4,756,438 A | 7/1988 | Ryder |
| 4,830,251 A | 5/1989 | Conrad |
| 4,842,153 A | 6/1989 | Hulon |
| 4,901,873 A | 2/1990 | Weiler |
| 4,928,835 A | 5/1990 | Collette et al. |
| 4,936,474 A | 6/1990 | Szczesniak et al. |
| 5,027,964 A | 7/1991 | Banich, Sr. |
| 5,040,692 A | 8/1991 | Julian |
| 5,104,704 A | 4/1992 | Labes et al. |
| 5,143,235 A | 9/1992 | Repp |
| 5,366,774 A | 11/1994 | Pinto et al. |
| 5,383,779 A | 1/1995 | Robinson |
| 5,403,538 A | 4/1995 | Maeda |
| 5,409,983 A | 4/1995 | Jones et al. |
| 5,431,291 A | 7/1995 | LaBombarbe, Jr. |
| 5,447,766 A | 9/1995 | Orimoto et al. |
| 5,450,972 A | 9/1995 | Zemlo |
| 5,464,106 A | 11/1995 | Slat et al. |
| 5,480,045 A | 1/1996 | Molinaro et al. |
| 5,593,055 A | 1/1997 | Repp et al. |
| 5,645,183 A | 7/1997 | Slat et al. |
| 5,647,495 A | 7/1997 | Orimoto et al. |
| 5,674,448 A | 10/1997 | Slat et al. |
| 5,676,267 A | 10/1997 | Slat et al. |
| 5,688,572 A | 11/1997 | Slat et al. |
| 5,690,244 A | 11/1997 | Darr |
| 5,756,172 A | 5/1998 | Semersky |
| 5,804,305 A | 9/1998 | Slat et al. |
| 5,850,932 A | 12/1998 | Beck et al. |
| 5,888,598 A | 3/1999 | Brewster et al. |
| 5,918,753 A | 7/1999 | Ogg et al. |
| 5,927,525 A | 7/1999 | Darr et al. |
| 5,951,938 A | 9/1999 | Takeuchi et al. |
| 5,954,216 A | 9/1999 | Meisner et al. |
| 5,971,184 A | 10/1999 | Krishnakumar et al. |
| 5,975,320 A | 11/1999 | Bietzer et al. |
| 6,006,930 A | 12/1999 | Dreyer et al. |
| 6,011,132 A | 1/2000 | Paschke et al. |
| 6,041,953 A | 3/2000 | Goodall |
| 6,060,140 A | 5/2000 | Sprayberry et al. |
| 6,063,325 A | 5/2000 | Nahill et al. |
| 6,082,568 A | 7/2000 | Flanagan |
| 6,085,924 A | 7/2000 | Henderson |

(56) References Cited

U.S. PATENT DOCUMENTS

| | | | |
|---|---|---|---|
| 6,105,800 A | 8/2000 | Czesak |
| 6,168,749 B1 | 1/2001 | Koch |
| 6,203,870 B1 | 3/2001 | Darr |
| 6,217,818 B1 | 4/2001 | Collette et al. |
| 6,276,546 B1 | 8/2001 | Davis et al. |
| 6,298,638 B1 | 10/2001 | Bettle |
| 6,305,564 B1 | 10/2001 | Takeuchi et al. |
| 6,349,838 B1 | 2/2002 | Saito et al. |
| 6,391,408 B1 | 5/2002 | Hutchinson |
| 6,461,697 B1 | 10/2002 | Slat et al. |
| 6,464,486 B1 | 10/2002 | Barray et al. |
| 6,548,133 B2 | 4/2003 | Schmidt et al. |
| 6,557,714 B2 | 5/2003 | Babcock et al. |
| 6,568,156 B2 | 5/2003 | Silvers et al. |
| 6,569,370 B1 | 5/2003 | Amin et al. |
| 6,635,325 B1 | 10/2003 | Hebert |
| 6,637,611 B2 | 10/2003 | Luch |
| 6,641,774 B2 | 11/2003 | Slat et al. |
| 6,673,303 B2 | 1/2004 | White et al. |
| 6,745,919 B2 | 6/2004 | Moros |
| 6,749,796 B1 | 6/2004 | Hansen |
| 6,779,677 B2 | 8/2004 | Chupak |
| 6,796,450 B2 | 9/2004 | Prevot et al. |
| 6,808,820 B2 | 10/2004 | Lee et al. |
| 6,837,390 B2 | 1/2005 | Lane et al. |
| 6,841,262 B1 | 1/2005 | Beck et al. |
| 6,854,614 B2 | 2/2005 | Sprick |
| 6,929,139 B2 | 8/2005 | Darr |
| 6,939,498 B2 | 9/2005 | Wong |
| 6,939,591 B2 | 9/2005 | Hutchinson et al. |
| 6,948,630 B2 | 9/2005 | Julian et al. |
| 6,971,530 B2 | 12/2005 | Darr |
| 6,977,104 B1 | 12/2005 | Nahill et al. |
| 6,991,336 B2 | 1/2006 | Matsui |
| 7,028,857 B2 | 4/2006 | Peronek |
| 7,037,099 B2 | 5/2006 | Linke et al. |
| 7,080,747 B2 | 7/2006 | Lane et al. |
| 7,150,902 B2 | 12/2006 | Farha |
| 7,207,451 B2 | 4/2007 | Taylor et al. |
| 7,226,648 B2 | 6/2007 | Al Ghatta et al. |
| 7,332,204 B2 | 2/2008 | Hutchinson et al. |
| 7,531,125 B2 | 5/2009 | Dygert |
| 7,531,226 B2 | 5/2009 | Lee et al. |
| 7,553,441 B2 | 6/2009 | Shi |
| 7,574,938 B2 | 8/2009 | Andrews |
| 7,654,168 B2 | 2/2010 | Obrien |
| 7,708,159 B2 | 5/2010 | Darr et al. |
| 7,735,663 B2 | 6/2010 | Tanaka et al. |
| 7,770,745 B2 | 8/2010 | Weissmann et al. |
| 7,798,357 B2 | 9/2010 | Hanafusa et al. |
| 7,820,257 B2 | 10/2010 | Kjorlaug et al. |
| 7,882,977 B2 | 2/2011 | Johnson |
| 7,918,355 B2 | 4/2011 | Penny |
| 7,918,356 B2 | 4/2011 | Penny |
| 7,976,767 B2 | 7/2011 | Ungrady et al. |
| 8,037,734 B2 | 10/2011 | Hanafusa et al. |
| 8,132,439 B2 | 3/2012 | Hanafusa et al. |
| 8,308,002 B2 | 11/2012 | Penny |
| 8,308,005 B2 | 11/2012 | Penny |
| 8,317,042 B2 | 11/2012 | Cerveny |
| 8,413,829 B2 | 4/2013 | Penny |
| 8,499,601 B2 | 8/2013 | Hanafusa et al. |
| 8,740,001 B2 | 6/2014 | Hanafusa et al. |
| 8,857,637 B2 | 10/2014 | Darr |
| 9,033,168 B2 | 5/2015 | Darr |
| 9,139,326 B2 | 9/2015 | Darr |
| 9,403,310 B2 | 8/2016 | Darr |
| 9,522,759 B2 | 12/2016 | Darr |
| 9,738,409 B2 | 8/2017 | Darr |
| 9,850,019 B2 | 12/2017 | Darr |
| 10,023,345 B2 | 7/2018 | Darr |
| 10,266,299 B2 | 4/2019 | Darr |
| 10,457,437 B2 | 10/2019 | Darr |
| 11,560,250 B2 | 1/2023 | Darr |
| 11,780,634 B2 | 10/2023 | Darr |
| 11,834,222 B2 | 12/2023 | Darr |
| 2001/0038171 A1 | 11/2001 | Darr |
| 2001/0054779 A1 | 12/2001 | Collette et al. |
| 2002/0022099 A1 | 2/2002 | Schmidt et al. |
| 2002/0134747 A1 | 9/2002 | Babcock et al. |
| 2002/0162818 A1 | 11/2002 | Williams |
| 2003/0001311 A1 | 1/2003 | Collette et al. |
| 2003/0041568 A1 | 3/2003 | Seidita |
| 2003/0071007 A1 | 4/2003 | Ma et al. |
| 2003/0102278 A1 | 6/2003 | Chupak |
| 2003/0116522 A1 | 6/2003 | Julian et al. |
| 2003/0155320 A1 | 8/2003 | Peronek et al. |
| 2003/0235667 A1 | 12/2003 | Darr et al. |
| 2004/0084333 A1 | 5/2004 | Boyd |
| 2004/0091651 A1 | 5/2004 | Rule et al. |
| 2004/0129669 A1 | 7/2004 | Kelley et al. |
| 2004/0146675 A1 | 7/2004 | Hashimoto et al. |
| 2004/0209022 A1 | 10/2004 | Ghatta et al. |
| 2005/0053739 A1 | 3/2005 | Lee et al. |
| 2005/0072751 A1 | 4/2005 | Price |
| 2005/0092390 A1 | 5/2005 | Krulitsch |
| 2005/0139566 A1 | 6/2005 | Uesugi et al. |
| 2005/0153089 A1 | 7/2005 | Lynch et al. |
| 2005/0158495 A1 | 7/2005 | Nahill |
| 2005/0167879 A1 | 8/2005 | Smith |
| 2005/0258127 A1 | 11/2005 | Darr |
| 2005/0271843 A1 | 12/2005 | Collette et al. |
| 2006/0105127 A1 | 5/2006 | Akiyama et al. |
| 2006/0121222 A1 | 6/2006 | Andrich et al. |
| 2006/0207961 A1 | 9/2006 | Kurtz |
| 2006/0255049 A1 | 11/2006 | McCarthy et al. |
| 2007/0087214 A1 | 4/2007 | Portnoy et al. |
| 2007/0108668 A1 | 5/2007 | Hutchinson et al. |
| 2007/0175854 A1 | 8/2007 | Penny |
| 2007/0175855 A1 | 8/2007 | Penny |
| 2007/0205175 A1 | 9/2007 | Darr et al. |
| 2007/0210026 A1 | 9/2007 | Darr et al. |
| 2007/0224374 A1 | 9/2007 | Kelley |
| 2007/0257001 A1 | 11/2007 | Paz |
| 2008/0050546 A1 | 2/2008 | Kitano et al. |
| 2008/0290099 A1 | 11/2008 | MacDonald et al. |
| 2010/0270255 A1 | 10/2010 | Penny |
| 2010/0270256 A1 | 10/2010 | Penny |

FOREIGN PATENT DOCUMENTS

| | | |
|---|---|---|
| DE | 2807949 | 8/1979 |
| DE | 2910609 | 9/1980 |
| DE | 4107011 | 9/1992 |
| DE | 10021961 | 11/2001 |
| DE | 10201850 | 8/2002 |
| DE | 10349753 | 6/2005 |
| DE | 202005017075 | 2/2006 |
| EP | 0049876 | 4/1982 |
| EP | 0269920 | 6/1988 |
| EP | 0316167 | 5/1989 |
| EP | 0574472 | 12/1993 |
| EP | 1371477 | 12/2003 |
| EP | 1417141 | 5/2004 |
| EP | 1468925 | 10/2004 |
| EP | 1529736 | 5/2005 |
| EP | 1633639 | 3/2006 |
| EP | 1714887 | 10/2006 |
| EP | 07101873 A | 2/2007 |
| EP | 1885602 | 2/2008 |
| EP | 2167385 | 3/2010 |
| EP | 2933201 A1 | 10/2015 |
| EP | 2933201 B1 | 7/2018 |
| FR | 2758800 | 7/1998 |
| FR | 2846946 | 5/2004 |
| GB | 1531783 | 11/1978 |
| GB | 2085395 | 4/1982 |
| GB | 2124543 | 2/1984 |
| GB | 2357491 | 7/2003 |
| JP | S54-140687 | 11/1979 |
| JP | S59-184627 | 10/1984 |
| JP | H09-239852 | 9/1997 |
| JP | 2578523 | 8/1998 |
| JP | 2000-211017 | 8/2000 |

(56) References Cited

FOREIGN PATENT DOCUMENTS

| JP | 2001-122237 | 5/2001 |
|---|---|---|
| JP | 2002-080021 | 3/2002 |
| JP | 2002-240136 | 8/2002 |
| JP | 2002-248675 | 9/2002 |
| JP | 2002-249651 | 9/2002 |
| JP | 2002-284132 | 10/2002 |
| JP | 2003-011211 | 1/2003 |
| JP | 2003-267334 | 9/2003 |
| JP | 2004-083128 | 3/2004 |
| JP | 2005-001383 | 1/2005 |
| JP | 2007-039109 | 2/2007 |
| JP | 4074143 | 4/2008 |
| JP | 4570838 | 10/2010 |
| JP | 4908544 | 4/2012 |
| KR | 1020050005232 A | 1/2005 |
| WO | WO 1992/015442 | 9/1992 |
| WO | WO 1996/33062 | 10/1996 |
| WO | WO 1998/25752 | 6/1998 |
| WO | WO 1998/29314 | 7/1998 |
| WO | WO 1999/61325 | 12/1999 |
| WO | WO 1999/61337 | 12/1999 |
| WO | WO 2003/008293 | 1/2003 |
| WO | WO 2003/057572 | 7/2003 |
| WO | WO 2004/030895 | 4/2004 |
| WO | WO 2004/035394 | 4/2004 |
| WO | WO 2004/043794 | 5/2004 |
| WO | WO 2004/065105 | 8/2004 |
| WO | WO 2004/106174 | 12/2004 |
| WO | WO 2005/047120 | 5/2005 |
| WO | WO 2006/013443 | 2/2006 |
| WO | WO 2006/066356 | 6/2006 |
| WO | WO 2007/085896 | 8/2007 |
| WO | WO 2007/089552 | 8/2007 |
| WO | WO 2007/089566 | 8/2007 |
| WO | WO 2008/095842 | 8/2008 |
| WO | WO 2008/144417 | 11/2008 |

OTHER PUBLICATIONS

[No Author Listed], "Attendee List," Plastics Caps & Closures 2006, Brussels, Belgium, Nov. 7-8, 2006, 5 pages (publication date, if any, unknown).

[No Author Listed], "Capping resin price rises," European Plastics News, Dec. 2006, 22.

[No Author Listed], "Green? Environment Yes but Cost Savings Also," Tetra Pak, Brussels Conference, Nov. 27, 2007, 35 pages (publication date, if any, unknown).

[No Author Listed], "Multi Lok* 27 mm," 14 pages (publication date, if any, unknown).

[No Author Listed], "Novembal Business News," Journal d'information de Novembal, Jan. 2007, 5, 9 pages (with English translation).

[No Author Listed], "SACMI ML-27 Short CSD Closure—Ambient & Elevated T CO2 Tests, Cold & Ambient Removal Torque Tests (JML-0017)," Jun. 2006, 2 pages (publication date, if any, unknown).

[No Author Listed], "SFR 9/27 Specifications and possible bi configurations," SIPA at PETnology Forum 2004, May 2004, 1 page (publication date, if any, unknown).

[No Author Listed], "SIPA latest development in two step technology," SIPA at PETnology Forum 2004, May 2004, 19 pages (publication date, if any, unknown).

[No Author Listed], "Standard Specification for Dimensions and Tolerances for Plastic Bottles," ASTM International, reapproved 2001, 1-16.

[No Author Listed], "Thread Finish Standards," Husky, Aug. 2006, 32 pages.

[No Author Listed], "Updated Programme—new speakers confirmed," Plastics Caps & Closures 2006, Brussels, Belgium, Nov. 7-8, 2006, 4 pages (publication date, if any, unknown).

[No Author Listed], Declarations relating to cited "Bottles, Preforms, Closures: A Design Guide for PET Packaging," edited by Ottmar Brandau, 19 pages (publication date, if any, unknown).

Blow Molding of Thermoplastics, Plastics Engineering Handbook of the Society of the Plastics Industry, 5th ed., Berins (ed.), 1991, 363, 5 pages.

bottledwaterworld.com [online], "Best Bottle in PET," Design Awards 2006, Sep.-Oct. 2006, 38:26-47.

Bottles, Preforms, Closures: A Design Guide for PET Packaging, Brandau (ed.), vol. 4, 2005, 142-143, 5 pages.

Brandau, "Stretch Blow Molding," Plastic Design Library (POL), POL Handbook Series, 3rd Ed., 2017, 1-4, 8 pages.

Budynas, Advanced Strength and Applied Stress Analysis, 2nd ed., 1999, 348-357, 509-511, 15 pages.

data.europa.eu [online], "European Parliament and Council Directive 94/62/EC of Dec. 20, 1994 on packaging and packaging waste," Dec. 31, 1994, retrieved from URL <http//data.europa.eu/eli/dir/1994/62/2015-05-26>, 29 pages.

devtechpet.com [online], "Preforma 38SP400," retrieved on Jul. 22, 2020, retrieved at URL <devtechpet.com/en/packaging-solutions/group-product-catalogue/pet- packaging/productdetails/?filter8y=&product=16728>, 1 page (publication date unknown).

Extended European Search Report in European Appln. No. 07749157.9, dated Jun. 2, 2010, 5 pages.

Extended European Search Report in European Appln. No. 08755571.0, dated Jan. 7, 2011, 5 pages.

Extended European Search Report in European Appln. No. 15164122.2, dated Aug. 31, 2015, 5 pages.

*Husky Injection molding Systems, Ltd. And Husky Injection Molding Systems, Inc.*, Petitioner, v. *Plastipak Packaging, Inc.*, Case No. IPR2020-00428, Patent Owner; U.S. Pat. No. 8,857,637, Decision Denying Institution of Inter Partes Review, Jul. 28, 2020, 21 pages.

*Husky Injection molding Systems, Ltd. And Husky Injection Molding Systems, Inc.*, Petitioner, v. *Plastipak Packaging, Inc.*, Case No. IPR2020-00429, Patent Owner; U.S. Pat. No. 9,033,168, Decision Denying Institution of Inter Partes Review, Jul. 28, 2020, 22 pages.

*Husky Injection molding Systems, Ltd. And Husky Injection Molding Systems, Inc.*, Petitioner, v. *Plastipak Packaging, Inc.*, Case No. IPR2020-00430, Patent Owner; U.S. Pat. No. 9,139,326, Decision Denying Institution of Inter Partes Review, Jul. 28, 2020, 23 pages.

*Husky Injection molding Systems, Ltd. And Husky Injection Molding Systems, Inc.*, Petitioner, v. *Plastipak Packaging, Inc.*, Case No. IPR2020-00431, Patent Owner; U.S. Pat. No. 9,403,310, Decision Denying Institution of Inter Partes Review, Jul. 28, 2020, 24 pages.

*Husky Injection molding Systems, Ltd. And Husky Injection Molding Systems, Inc.*, Petitioner, v. *Plastipak Packaging, Inc.*, Case No. IPR2020-00432, Patent Owner; U.S. Pat. No. 9,522,759, Decision Denying Institution of Inter Partes Review, Jul. 28, 2020, 23 pages.

*Husky Injection molding Systems, Ltd. And Husky Injection Molding Systems, Inc.*, Petitioner, v. *Plastipak Packaging, Inc.*, Case No. IPR2020-00433, Patent Owner; U.S. Pat. No. 9,850,019, Decision Denying Institution of Inter Partes Review, Jul. 28, 2020, 23 pages.

*Husky Injection molding Systems, Ltd. And Husky Injection Molding Systems, Inc.*, Petitioner, v. *Plastipak Packaging, Inc.*, Case No. IPR2020-00434, Patent Owner; U.S. Pat. No. 9,738,409, Decision Denying Institution of Inter Partes Review, Jul. 28, 2020, 23 pages.

*Husky Injection molding Systems, Ltd. And Husky Injection Molding Systems, Inc.*, Petitioner, v. *Plastipak Packaging, Inc.*, Case No. IPR2020-00435, Patent Owner; U.S. Pat. No. 10,023,345, Decision Denying Institution of Inter Partes Review, Jul. 28, 2020, 24 pages.

*Husky Injection molding Systems, Ltd. And Husky Injection Molding Systems, Inc.*, Petitioner, v. *Plastipak Packaging, Inc.*, Case No. IPR2020-00436, Patent Owner; U.S. Pat. No. 10,266,299, Decision Denying Institution of Inter Partes Review, Jul. 28, 2020, 23 pages.

*Husky Injection molding Systems, Ltd. And Husky Injection Molding Systems, Inc.*, Petitioner, v. *Plastipak Packaging, Inc.*, Case No. IPR2020-00437, Patent Owner; U.S. Pat. No. 10,214,311, Decision Denying Institution of Inter Partes Review, Jul. 29, 2020, 23 pages.

*Husky Injection molding Systems, Ltd. And Husky Injection Molding Systems, Inc.*, Petitioner, v. *Plastipak Packaging, Inc.*, Case No. IPR2020-00438, Patent Owner; U.S. Pat. No. 10,214,312, Decision Denying Institution of Inter Partes Review, Jul. 29, 2020, 22 pages.

*Husky Injection molding Systems, Ltd. And Husky Injection Molding Systems, Inc.*, Petitioner, v. *Plastipak Packaging, Inc.*, Case No. IPR2020-00439, Patent Owner; U.S. Pat. No. 10,457,437, Decision Denying Institution of Inter Partes Review, Jul. 28, 2020, 23 pages.

(56) References Cited

OTHER PUBLICATIONS

Ifuku et al., "International News," Beverage Japan, 2006, 299(11):80, 6 pages (with English translation).
International Search Report and Written Opinion in International Appln. No. PCT/US07/01880, dated Nov. 19, 2007, 5 pages.
International Search Report and Written Opinion in International Appln. No. PCT/US08/63744, dated Sep. 2, 2008, 8 pages.
ISBT Threadspecs, "Alcoa—1690 Voluntary Standard 38mm CSD finish," 1 page (drawing dated Jun. 6, 2001; publication date, if any, unknown).
ISBT Threadspecs, "Alcoa—1716 Voluntary Standard 28mm CSD finish," 1 page (drawing dated Apr. 15, 1999; publication date, if any, unknown).
ISBT Threadspecs, "Alcoa—1788 Voluntary Standard 28mm CSD finish," 1 page (drawing dated Apr. 15, 1999; publication date, if any, unknown).
ISBT Threadspecs, "BPF-C Voluntary Standard 28mm CSD finish," 1 page (drawing dated Oct. 19, 2000; publication date, if any, unknown).
ISBT Threadspecs, "Flat Water," 1 page (drawing dated Dec. 12, 2011; publication date, if any, unknown).
ISBT Threadspecs, "Hot-Fill," 1 page (publication date, if any, unknown).
ISBT Threadspecs, "ISBT Threadspecs Nomenclature," 2 pages (publication date, if any, unknown).
ISBT Threadspecs, "ISBT Threadspecs Voluntary Standard Thread Finish Specifications Nomenclature Feature Terminologies," 2 pages (publication date, if any, unknown).
ISBT Threadspecs, "ISBT Voluntary Standard Flatwater Finish PCF-26P-1 ("US Standard")," 1 page (drawing dated May 15, 2002; publication date, if any, unknown).
ISBT Threadspecs, "Obrist-28 (18mm) Voluntary Standard Flatwater Finish," 1 page (drawing dated Feb. 23, 1999; publication date, if any, unknown).
ISBT Threadspecs, "Obrist-28 (19mm) Voluntary Standard Flatwater Finish," 1 page (drawing dated Feb. 23, 1999; publication date, if any, unknown).
ISBT Threadspecs, "PCF-33P-1 Voluntary Standard Hot Fill Finish," 1 page (drawing dated Dec. 10, 1999; publication date, if any, unknown).
ISBT Threadspecs, "PCF-38G-3 Voluntary Standard Hot Fill Finish," 1 page (drawing dated Dec. 10, 1999; publication date, if any, unknown).
ISBT Threadspecs, "PCF-38P-2 Voluntary Standard Hot Fill Finish," 1 page (drawing dated Dec. 10, 1999; publication date, if any, unknown).
ISBT Threadspecs, "PCF-38P-4 Voluntary Standard Hot Fill Finish," 1 page (drawing dated Dec. 10, 1999; publication date, if any, unknown).
ISBT Threadspecs, "PCF-38P-5 Voluntary Standard Non-Carbonated beverage finish (extrusion blown)," 1 page (drawing dated Nov. 21, 2001; publication date, if any, unknown).
ISBT Threadspecs, "PCF-38P-1 Voluntary Standard Hot Fill Finish," 1 page (drawing dated Dec. 10, 1999; publication date, if any, unknown).
ISBT Threadspecs, "PCF-43P-1 Voluntary Standard Hot Fill Finish," 1 page (drawing dated Jan. 17, 2000; publication date, if any, unknown).
ISBT Threadspecs, "PCF-48P-2 Voluntary Standard Hot Fill Finish," 1 page (drawing dated Jan. 17, 2000; publication date, if any, unknown).
ISBT Threadspecs, "PCF-48P-3 Voluntary Standard Hot Fill Finish," 1 page (drawing dated Jan. 17, 2000; publication date, if any, unknown).
ISBT Threadspecs, "PCF-48P-4 Voluntary Standard Hot Fill Finish," 1 page (drawing dated Jan. 17, 2000; publication date, if any, unknown).
ISBT Threadspecs, "PCF-48P-5 Voluntary Standard Hot Fill Finish," 1 page (drawing dated Jan. 17, 2000); publication date, if any, unknown).
ISBT Threadspecs, "PCF-26P-2 Voluntary Standard Flatwater Finish," 1 pages (drawing dated May 15, 2002; publication date, if any, unknown).
ISBT Threadspecs, "PCO-1810 Voluntary Standard 28mm CSD finish," 1 page (drawing dated May 29, 1998; publication date, if any, unknown).
ISBT Threadspecs, "PCO-1815 Voluntary Standard 28mm CSD finish," 1 page (drawing dated May 29, 1998; publication date, if any, unknown).
ISBT Threadspecs, "PCO-1816 Voluntary Standard 28mm CSD finish," 1 page (drawing dated May 29, 1998; publication date, if any, unknown).
ISBT Threadspecs, "PCO-1817 Voluntary Standard 28mm CSD finish," 1 page (drawing dated May 29, 1998; publication date, if any, unknown).
ISBT Threadspecs, "PCO-1820 Voluntary Standard 28mm CSD finish," 1 page (drawing dated May 29, 1998; publication date, if any, unknown).
ISBT Threadspecs, "PCO—1823 Voluntary Standard 28mm CSD finish," 1 page (drawing dated May 29, 1998; publication date, if any, unknown).
ISBT Threadspecs, "PCO-1881 Voluntary Standard 28mm CSD finish," 1 page (drawing dated Feb. 14, 2007; publication date, if any, unknown).
ISBT Threadspecs, "PCO—38 Voluntary Standard 38mm CSD Finish," 1 page (drawing dated Oct. 19, 2000; publication date, if any, unknown).
ISBT Threadspecs, "SP-400 Voluntary Standard," 1 page (drawing dated Mar. 10, 1999; publication date, if any, unknown).
ISBT Threadspecs, "SP-410 Voluntary Standard," 1 page (drawing dated Mar. 10, 1999; publication date, if any, unknown).
ISBT Threadspecs, "SP-415 Voluntary Standard," 1 page (drawing dated Mar. 10, 1999; publication date, if any, unknown).
ISBT Threadspecs, "SPI-Series," 1 page (publication date, if any, unknown).
ISBT Threadspecs, "Terminologies for Bottle Finishes," 1 page (drawing dated Jun. 12, 2001; publication date, if any, unknown).
ISBT Threadspecs, "Voluntary Standard PET Finish Dimension Nomenclature," 1 page (drawing dated May 29, 1998; publication date, if any, unknown).
ISBT, "Reduced height/Lightweight PCO 1881 Finish Subcommittee: Minutes of Meeting," Meeting #10, Oct. 17, 2006, 8 pages (publication date, if any, unknown).
ISBT, "Reduced height/Lightweight PCO 1881 Finish Subcommittee: Minutes of Meeting," Meeting #11, Oct. 24, 2006, 6 pages (publication date, if any, unknown).
ISBT, "Reduced height/Lightweight PCO 1881 Finish Subcommittee: Minutes of Meeting," Meeting #12, Nov. 2, 2006, 6 pages (publication date, if any, unknown).
ISBT, "Reduced height/Lightweight PCO 1881 Finish Subcommittee: Minutes of Meeting," Meeting #13, Nov. 14, 2006, 6 pages (publication date, if any, unknown).
ISBT, "Reduced height/Lightweight PCO 1881 Finish Subcommittee: Minutes of Meeting," Meeting #14, Nov. 28, 2006, 7 pages (publication date, if any, unknown).
ISBT, "Reduced height/Lightweight PCO 1881 Finish Subcommittee: Minutes of Meeting," Meeting #15, Dec. 12, 2006, 7 pages (publication date, if any, unknown).
ISBT, "Reduced height/Lightweight PCO 1881 Finish Subcommittee: Minutes of Meeting," Meeting #6, Aug. 1, 2006, 7 pages (publication date, if any, unknown).
ISBT, "Reduced height/Lightweight PCO 1881 Finish Subcommittee: Minutes of Meeting," Meeting #7, Aug. 22 & 23, 2006, 7 pages (publication date, if any, unknown).
ISBT, "Reduced height/Lightweight PCO 1881 Finish Subcommittee: Minutes of Meeting," Meeting #89, Jul. 9, 2013, 8 pages (publication date, if any, unknown).
ISBT, "Reduced height/Lightweight PCO 1881 Finish Subcommittee: Minutes of Meeting," Meeting #9, Oct. 5, 2006, 8 pages (publication date, if any, unknown).
ISBT, "Reduced height/Lightweight PCO Finish Subcommittee: Minutes of Meeting," Meeting #3, Jun. 15, 2006, 5 pages (publication date, if any, unknown).

(56) References Cited

OTHER PUBLICATIONS

ISBT, "Reduced height/Lightweight PCO Finish Subcommittee: Minutes of Meeting," Meeting #4, Jun. 27, 2006, 6 pages (publication date, if any, unknown).
ISBT, "Reduced height/Lightweight PCO Finish Subcommittee: Minutes of Meeting," Meeting #5, Jul. 12, 2006, 6 pages (publication date, if any, unknown).
ISBT, "Short Height Finish Subcommittee: Minutes of Meeting," Meeting #1, Apr. 24, 2006, 3 pages (publication date, if any, unknown).
ISBT, "Short Height Finish Subcommittee: Minutes of Meeting," Meeting #2, May 2, 2006, 3 pages (publication date, if any, unknown).
Krautkramer, "Short Necks and Closures for Carbonated Beverages—a PET saving initiative," Bericap, 27 pages (publication date, if any, unknown).
Krupp Corpoplast Maschinenbau GmbH, "Operating Instructions: Blow Moulding Machine B 177," Operator Reference Manual, 1995, 9 pages.
Lamarche, "Solutions to lighter plastic closures for use in water bottles," Plastics Caps & Closures 2006, Brussels, Belgium, Nov. 7-8, 2006, 28 pages (publication date, if any, unknown).
linkplas.com [online], "Winners at Bottled Water Awards," Sep. 19, 2006, retrieved at URL <https://www.linkplas.com/Awards/Winners+at+Bottled+Water+Awards.html>, 1 page.
Novembal, "Danone Innovation Day," May 31, 2006, 3 pages (publication date, if any, unknown).
Novembal, "Novaqua 29.4," 2 pages (publication date, if any, unknown).
Opposition, ""foodproductiondaily" , [gefundenFeb. 4, 2021]," Exhibit D59 in European Appln. No. 15164122.2, dated Feb. 5, 2021, 2 pages.
Opposition, ""Interempresas" , [gefundenFeb. 4, 2021]," Exhibit D64 in European Appln. No. 15164122.2, dated Feb. 5, 2021, 4 pages (with English translation).
Opposition, "Affidavit Paulo Correia," Exhibit D17 in European Appln. No. 15164122.2, dated Sep. 2, 2020, 7 pages.
Opposition, "Auszug aus Wayback-Machine," Exhibit D31 in European Appln. No. 15164122.2, dated Oct. 7, 2020, 1 page.
Opposition, "Data Sheet Packaging Glass," Exhibit D32 in European Appln. No. 15164122.2, dated Oct. 7, 2020, 3 pages.
Opposition, "Eidesstattliche Versicherung Herr Thomas Anderegg," Exhibit D56 in European Appln. No. 15164122.2, dated Feb. 5, 2021, 3 pages (with English translation).
Opposition, "Eidesstattliche Versicherung van Dr. Michael Kruger," Exhibit D57 in European Appln. No. 15164122.2, dated Feb. 5, 2021, 4 pages (with English translation).
Opposition, "Eidesstattliche Versicherung van Frau Barbara Appel," Exhibit D42 in European Appln. No. 15164122.2, dated Feb. 5, 2021, 4 pages (with English translation).
Opposition, "Eidesstattliche Versicherung van Frau Barbara Appel," Exhibit D55 in European Appln. No. 15164122.2, dated Feb. 5, 2021, 4 pages (with English translation).
Opposition, "Eidesstattliche Versicherung van Herr Alexander Krautkramer," Exhibit D54 in European Appln. No. 15164122.2, dated Feb. 5, 2021, 3 pages (with English translation).
Opposition, "Eidesstattliche Versicherung van Herr Andreas Reich," Exhibit D45 in European Appln. No. 15164122.2, dated Feb. 5, 2021, 3 pages (with English translation).
Opposition, "Eidesstattliche Versicherung van Herr Fiorenza Parrinello," Exhibit D43 in European Appln. No. 15164122.2, dated Feb. 5, 2021, 3 pages.
Opposition, "Eidesstattliche Versicherung van Herr Jochen Forsthovel," Exhibit D44 in European Appln. No. 15164122.2, dated Feb. 5, 2021, 3 pages (with English translation).
Opposition, "Eidesstattliche Versicherung van Herr Werner Rosenberger," Exhibit D63 in European Appln. No. 15164122.2, dated Feb. 5, 2021, 2 pages (with English translation).
Opposition, "Handbook bottles front and p. 143," Exhibit D15 in European Appln. No. 15164122.2, dated Sep. 20, 2019, 2 pages.
Opposition, "Handout," Exhibit D39 in European Appln. No. 15164122.2, dated Feb. 5, 2021, 17 pages.
Opposition, "Husky Zeichnung," Exhibit D14 in European Appln. No. 15164122.2, dated Apr. 25, 2019, 1 page.
Opposition, "In response to the Patent Proprietor's written statement dated Oct. 2, 2020," European Appln. No. 15164122.2, dated Feb. 5, 2021, 98 pages (with English translation).
Opposition, "In response to the summons dated Oct. 16 to an oral hearing," European Appln. No. 15164122.2, dated Feb. 5, 2021, 12 pages (with English translation).
Opposition, "Invoice 1," Exhibit D18 in European Appln. No. 15164122.2, dated Sep. 2, 2020, 3 pages.
Opposition, "Invoice 2," Exhibit D19 in European Appln. No. 15164122.2, dated Sep. 2, 2020, 3 pages.
Opposition, "Invoice 3," Exhibit D20 in European Appln. No. 15164122.2, dated Sep. 2, 2020, 2 pages.
Opposition, "Invoice 4," Exhibit D21 in European Appln. No. 15164122.2, dated Sep. 2, 2020, 3 pages.
Opposition, "Invoice 5," Exhibit D22 in European Appln. No. 15164122.2, dated Sep. 2, 2020, 3 pages.
Opposition, "Katalog HUSKY," Exhibit D30 in European Appln. No. 15164122.2, dated Oct. 7, 2020, 32 pages.
Opposition, "Letter Plastipak to CETIE Jan. 2021," Exhibit D69 in European Appln. No. 15164122.2, dated Apr. 2, 2021, 1 page.
Opposition, "Letter Plastipak to CETIE," Exhibit D68 in European Appln. No. 15164122.2, dated Apr. 2, 2021, 2 pages.
Opposition, "MHT is part of Krones as one party," Exhibit D16 in European Appln. No. 15164122.2, dated Sep. 20, 2019, 1 page.
Opposition, "Norm GME 30.28," Exhibit D71 in European Appln. No. 15164122.2, dated Apr. 2, 2021, 3 pages.
Opposition, "Norm GME 30.38," Exhibit D70 in European Appln. No. 15164122.2, dated Apr. 2, 2021, 4 pages.
Opposition, "On the correspondence of patent-holder of Feb. 8, 2021," European Appln. No. 15164122.2, dated Mar. 9, 2021, 36 pages (with English translation).
Opposition, "Prasentation, Nov. 27, 2007," Exhibit D13 in European Appln. No. 15164122.2, dated Apr. 25, 2019, 35 pages.
Opposition, "Preform 11, 5g 0, 33 I," Exhibit D23 in European Appln. No. 15164122.2, dated Sep. 2, 2020, 4 pages.
Opposition, "Preform 15g 0,5 I," Exhibit D24 in European Appln. No. 15164122.2, dated Sep. 2, 2020, 2 pages.
Opposition, "Signiert Frau Appel," Exhibit D34 in European Appln. No. 15164122.2, dated Feb. 5, 2021, 20 pages.
Opposition, "Signiert Frau Appel," Exhibit D50 in European Appln. No. 15164122.2, dated Feb. 5, 2021, 28 pages.
Opposition, "Signiert Herr Anderegg," Exhibit D53 in European Appln. No. 15164122.2, dated Feb. 5, 2021, 28 pages.
Opposition, "Signiert Herr Forsthovel," Exhibit D37 in European Appln. No. 15164122.2, dated Feb. 5, 2021, 20 pages.
Opposition, "Signiert Herr Krautkramer," Exhibit D51 in European Appln. No. 15164122.2, dated Feb. 5, 2021, 28 pages.
Opposition, "Signiert Herr Kruger," Exhibit D41 in European Appln. No. 15164122.2, dated Feb. 5, 2021, 17 pages.
Opposition, "Signiert Herr Kruger," Exhibit D48 in European Appln. No. 15164122.2, dated Feb. 5, 2021, 2 pages.
Opposition, "Signiert Herr Kruger," Exhibit D52 in European Appln. No. 15164122.2, dated Feb. 5, 2021, 28 pages.
Opposition, "Signiert Herr Parrinello," Exhibit D36 in European Appln. No. 15164122.2, dated Feb. 5, 2021, 20 pages.
Opposition, "Signiert Herr Parrinello," Exhibit D40 in European Appln. No. 15164122.2, dated Feb. 5, 2021, 12 pages.
Opposition, "Signiert Herr Parrinello," Exhibit D47 in European Appln. No. 15164122.2, dated Feb. 5, 2021, 2 pages.
Opposition, "Signiert Herr Reich," Exhibit D35 in European Appln. No. 15164122.2, dated Feb. 5, 2021, 20 pages.
Opposition, "Signiert Signiert Herr Kruger," Exhibit D38 in European Appln. No. 15164122.2, dated Feb. 5, 2021, 20 pages.
Opposition, "Zeichnung 191476," Exhibit D66 in European Appln. No. 15164122.2, dated Feb. 5, 2021, 1 page.
Opposition, "Zeichnung 2770143," Exhibit D65 in European Appln. No. 15164122.2, dated Feb. 5, 2021, 1 page.
Opposition, "Zeichnung 2874756," Exhibit D67 in European Appln. No. 15164122.2, dated Feb. 5, 2021, 1 page.

(56) References Cited

OTHER PUBLICATIONS

Opposition, "Zeichnung 9406_ 137 _067 02," Exhibit D62 in European Appln. No. 15164122.2, dated Feb. 5, 2021, 1 page.
packagingconnections.com [online], Good Morning Packaging Keeping Pace with Packaging Around the World Issue 24, vol. 1, 2006, Sep. 5, 2006, retrieved on Apr. 1, 2020, retrieved at URL <https://www.packagingconnections.com/news/good-morning-packaging-keeping-pace-packaging-around-worldissue-24-vol-1-2006.htm>, 6 pages.
packagingconnections.com [online], "Good Morning Packaging Keeping Pace with Packaging Around the World Issue 24, vol. 1, 2006," Sep. 2006, retrieved on Dec. 3, 2020, Packaging Connections, 7 pages (this item is a part of Exhibit A to Affidavit of Paulo Correia—this item not subject to the Attorney's Eyes Only designation).
Papiewski, "The Advantages of Plastic Bottles," retrieved on Dec. 13, 2019, retrieved at URL <https://education.seattlepi.com/advantages-plastic-bottles-4834.html>, 4 pages.
Parker, "How the Plastic Bottle went from Miracle Container to Hated Garbage," Aug. 23, 2019, retrieved at URL <https://www.nationalgeographic.com/environment/2019/08/plastic-bottles>, 5 pages.
PETnology GmbH, "Focus PET: Experts Presentations in Sessions and Knowledge Exchange in Workshops," The PETnology Forum 2004, IV. Annual Business and Technology Conference for the PET Packaging Industry, Munich, Germany, May 3-4, 2004, 1 page (publication date, if any, unknown).
Pitman, "Logoplaste Launches Europe's Lightest PET Bottle," Aug. 22, 2006, retrieved on Apr. 1, 2020, retrieved at URL <https://www.beveragedaily.com/Article/2006/08/23/Logoplaste-launches-Europes-lightest-PET-bottle>, 3 pages.
plasticsnews.com [online], "Plastics Resin Pricing—Commodity Thermoplastics: Bottle-grade PET resin with annual volumes greater than 20 million pounds," retrieved on Nov. 11, 2019, retrieved from URL <https://www.plasticsnews.com/resin/historicPricing/commodity-thermoplastics/pet/bottleresin/1?CSAuthResp=1%3A%3A383902%3A311%3A24%3As%E2%80%A6>, 9 pages.
plasticsnews.com [online], "Plastics Resin Pricing—Commodity Thermoplastics: Injection general purpose HDPE resin with annual volumes greater than 20 million pounds," retrieved on Nov. 11, 2019, retrieved from URL: <https://www.plasticsnews.com/resin/historicPricing/commodity-thermoplastics/hdpe/injection-gp/1/>, 9 pages.
plasticsnews.com [online], "Plastics Resin Pricing—Commodity Thermoplastics: Random copolymer injection PP resin with annual volumes greater than 20 million pounds," retrieved on Nov. 11, 2019, retrieved from URL: <https://www.plasticsnews.com/resin/historicPricing/commodity-thermoplastics/pp/randomcopolymer-injection/1 > 10 pages.
*Plastipak Packaging Inc.*, Plaintiff, v. *Ice River Springs USA, Inc. and Ice River Springs Water Co. Inc.*, Defendants, submitted in Civil Action No. 1: 19-cv-11193-IT [U.S. District Court for the District of Massachusetts], Exhibit B to Affidavit of Paulo Correia, dated Sep. 16, 2020, 13 pages. Note: With respect to Exhibits A and C of the Correia Affidavit, portions of the Exhibits filed with the Court were not available to Applicant—portions of of Exhibit A were designated "Confidential—For Counsel Only"—the public portions of Exhibit A have been provided herein; Exhibit C was designated "Confidential—Outside Counsel of Record Only."
*Plastipak Packaging, Inc.*, Plaintiff, v. *Ice River Springs Water Co. Inc. and Ice River Springs USA, Inc.*, Civil Action No. 1:19-cv-11193-IT, Affidavit of Paulo Correia on Behalf of Logoplaste Consultores Tecnicos, S.A., Sep. 16, 2020—submitted in Civil Action No. 1: 19-cv-11193-IT [U.S. District Court for the District of Massachusetts], 14 pages.
*Plastipak Packaging, Inc.*, Plaintiff, v. *Nestle Waters North America, Inc.*, Defendant, Case No. 1:20-cv-01288 (RDA-IDD), Declaration of Julio Manuel Da Rocha Cabral, May 27, 2021, 5 pages.
*Plastipak Packaging, Inc., Plaintiff*, v. *Nestle Waters North America, Inc.*, Defendant, Case No. 1:20-cv-01288 (RDA-IDD), Declaration of Pierre-Christophe Lamarche, Jul. 20, 2021, 9 pages.
*Plastipak Packaging, Inc.*, Plaintiff, v. *Premium Waters, Inc.*, Defendant, Case No. 3:20-cv-00098-wmc, Document 183, filed Aug. 19, 2021, 37 pages.
Preforms Plus, "30.0-Gram Preform," Print dated Feb. 25, 2011, published purportedly Sep. 24, 2012, 1 page.
Preforms Plus, Print dated Dec. 10, 2010, published purportedly Sep. 24, 2012, 1 page.
*Premium Waters, Inc.*, Petitioner, v. *Husky Injection Molding Systems, Inc.*, Respondent, Case: 1:20-cv-06098, Document #: 5-9, Filed: Oct. 13, 2020, Drawing Exhibit I—Husky, drawing purportedly dated 2004, 2 pages (publication date, if any, unknown).
radicles3.rssing.com [online], "GCS Press Releases," Feb. 4, 2007 Press Release, retrieved from URL <http://radicles3.rssing.com/chan-3122006/latest.php#item42>, 16 pages.
Sacmi 1295 Invoice, Sep. 2005, 2 pages (publication date, if any, unknown).
Sacmi, "ML 27," Jul. 25, 2006, 15 pages (publication date, if any, unknown).
Sacmi, "ML 27," Sep. 10, 2006, 35 pages (publication date, if any, unknown).
Scudellari, "Proforma Invoice No. OKUS05-045," Sacmi 1386, Sep. 2005, 23 pages (publication date, if any, unknown).
sec.gov [online], "2005 Annual Report of Danone S.A.," as filed with the Securities and Exchanges Commission on Apr. 20, 2006, retrieved from URL <https://www.sec.gov/Archives/edgar/data/1048515/000119312506084606/d20f.htm>, 210 pages.
Steeman, "Worldwide innovations in packaging technology with a 'touch of greenness' and an accent on sustainability and recyclability," Nov. 4, 2009, retrieved on Oct. 16, 2019, retrieved from URL <https://bestinpackaging.com/2009/11/04/short-shorter-the-shortest>, 2 pages.
Stone et al., "Closures for the Beverage Market—Alternative Solutions," PIRA Conference, Atlanta, GA, Jun. 19 and 21, 2007, 37 pages (publication date, if any, unknown).
The Editorial Staff of Emballages Magazine, "LogoPlaste allege ses bouteilles," Emballages Magazine, Aug. 24, 2006, retrieved on Apr. 1, 2020, retrieved at URL <https://www.emballagesmagazine.com/actualites/logoplaste-allege-ses-bouteilles.3493>, 9 pages (with English translation).
threadspecs.com [online], "ISBT Threadspecs Nomenclature," 2 pages (publication date, if any, unknown).
Velas et al., Blog Posts, retrieved on Jun. 18, 2020, retrieved at URL >http://chunk-o-funk.blogspot.com/2006/>, various 2006 dates, 28 pages (with English translation).
Zacarias, "Technology News," Logoplaste Technology, Lda, N°6, Jan. 2006, 6 pages.
Co-Pending Reissue U.S. Appl. No. 17/531,637, filed Mar. 6, 2006—which is a reissue application pertaining to U.S. Pat. No. 7,708,159, U.S. Appl. No. 11/368,860, filed Mar. 6, 2006.
Certified English translation of FR 2 846 946 (FR 2 846 946 has a filing date of Nov. 12, 2002, and the reference was previously cited in the IDS provided on Jul. 22, 2022 in parent U.S. Appl. No. 17/314,721).
New Bericap Neck Finish According to New ISBT's PCO 1881 (1 page) Dec. 8, 2006.
Novembal, "Closures for the Beverage Market—Alternative Solutions" Jun. 19, 2007, 37 pages (publication date, if any, unknown).
Bericap Supershorty for PCT 1881, SuperShorty from Bericap for new PCO1881 short height neck finish standard. (1 page) Dec. 14, 2006.
Unipack. RU Packaging Portal, Logoplaste launches Europe's lightest PET Bottle. (1 page) Aug. 30, 2006.
Bericap, Ferrarelle, A lightweight closure for 28 mm two-start thread neck finish for sparkling water. (1 page) Jun. 27, 2006.
Defosse, Matt, "Trim that neck with low-profile closures", Plastics Today. (3 pages) Feb. 1, 2007.
Keep Up with Blow Molding, "Shorter Closure Cuts PET Bottle Weight & Cost." (author unknown) access www.ptonline.com (1 page). Jan. 1, 2007.
I.I. Moroz, et al., "Investigation of the Organization of Lightweight Bottle Production," Ukranian Scientific Research Institute of the Glass and Porcelain_Faience Industry (UNISP) (5 pages) Feb. 1, 1971.

(56) References Cited

OTHER PUBLICATIONS (Author Unknown) The "Ugly Duckling" is hatched, PET container weight halved. (publication date, if any, unknown) (1 page).
Husky Exhibit 1006 Drawing (1 page) International Society of Beverage Technologies (Drawing dated May 15, 2002).
Exhibit 4, Email Invitation to Speak: Plastics Caps and Closures Nov. 7-8, 2006 Brussels from Victor Cooper to Lothar Brauer. (2 pages) Apr. 30, 2021.
Plastics Caps & Closures 2006 Innovative Technical Advances and Business Solutions for Cost Reduction and Quality Preservation Throughout the Value Chain, Brussels, Belgium. (4 pages) Nov. 7, 2006.
Exhibit 15, Nanetti, Luca, Sacmi Imola, SlideShow for ML27 Multi Lok 27 mm, "It is not just another short neck for still beverages." (24 pages) (publication, if any unknown).
Google Books: Library of the University of Wisconsin, S.E. Slocum, B.E., Ph.D., et al. "Text-Book on the Strength of Materials," Ginn & Company. (346 pages) (1907).
Kazmer>000017/000018—Revised Index by John S. Bowers of Nissei ASB Company (2 pages: (ii), (iii), 70, 71) (Dated Jun. 1, 1999, publication unknown).
LogoPlaste Lights Its Bottles, Editorial Staff of Emballages Mazazine; posted on Aug. 24, 2006. (4 pages) Apr. 1, 2020.
Conference Proceedings, "Packaging Closures and Sealing System," N. Theobald and B. Winder, 2006 (52 pages).
Exhibit 5, Plastics Caps & Closures 2006, "Innovative technical advances and business solutions for cost reduction and quality preservation throughout the value chain", Nov. 7-8, 2006, Brussels, Belgium (4 pages).
English translation of DE10349753 (DE10349753 already provided on Jul. 22, 2022 in parent U.S. Appl. No. 17/314,721).
Husky Exhibit 1012, Declaration of James D. Sykes dated Dec. 17, 2019, 11 pages.
Co-pending U.S. Appl. No. 18/377,493, filed Oct. 6, 2023.

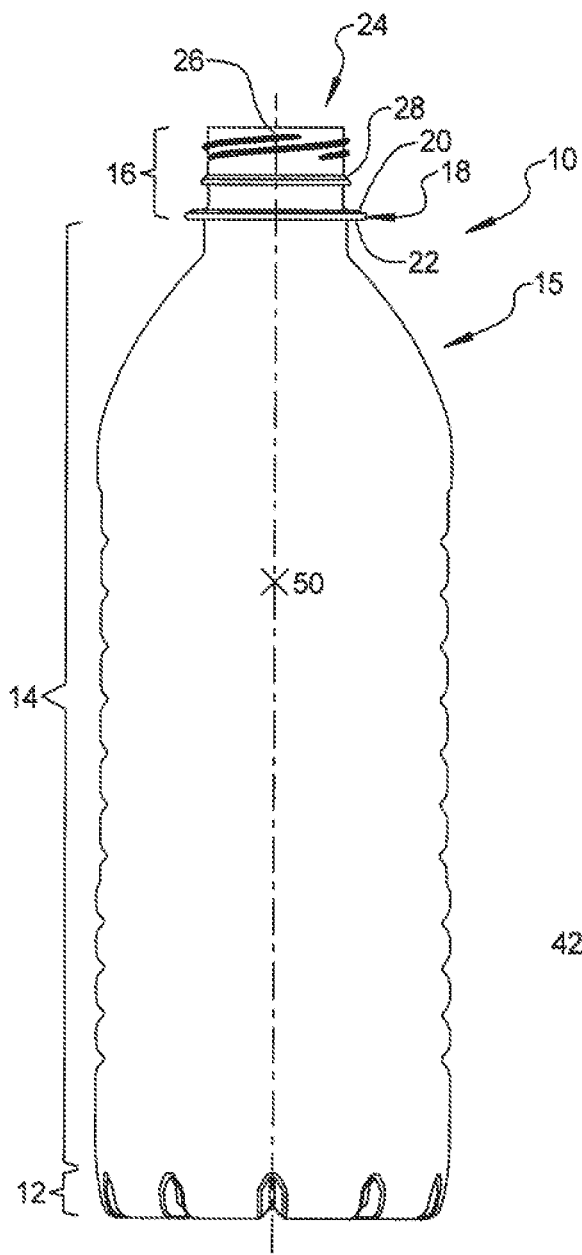
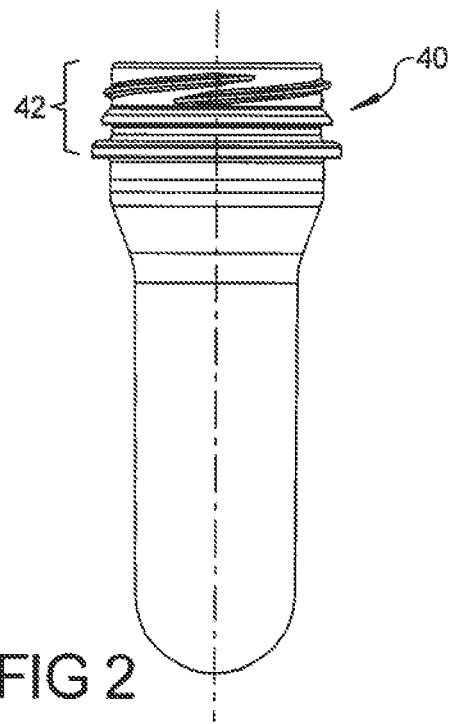
FIG 1
FIG 2

LIGHTWEIGHT PLASTIC CONTAINER AND PREFORM

CROSS-REFERENCE TO RELATED APPLICATIONS

This application is a continuation of U.S. patent application Ser. No. 18/099,446, filed Jan. 20, 2023, which is a continuation of U.S. patent application Ser. No. 17/314,721, filed May 7, 2021, now U.S. Pat. No. 11,560,250, which is a continuation of U.S. patent application Ser. No. 16/598,452, filed Oct. 10, 2019, which is a continuation of U.S. patent application Ser. No. 16/013,139, filed Jun. 20, 2018, now U.S. Pat. No. 10,457,437, which is a continuation of U.S. patent application Ser. No. 16/012,302, filed Jun. 19, 2018, now U.S. Pat. No. 10,266,299, which is a continuation of U.S. patent application Ser. No. 15/495,084, filed Apr. 24, 2017, now U.S. Pat. No. 10,023,345, which is a continuation of U.S. patent application Ser. No. 15/404,731, filed Jan. 12, 2017, now U.S. Pat. No. 9,738,409, which is a continuation of U.S. patent application Ser. No. 15/383,179, filed Dec. 19, 2016, now U.S. Pat. No. 9,850,019, which is a continuation of U.S. patent application Ser. No. 15/220,731, filed Jul. 27, 2016, now U.S. Pat. No. 9,522,759, which is a continuation of U.S. patent application Ser. No. 14/803,505, filed Jul. 20, 2015, now U.S. Pat. No. 9,403,310, which is a continuation of U.S. patent application Ser. No. 14/688,734, filed Apr. 16, 2015, now U.S. Pat. No. 9,139,326, which is a continuation of U.S. patent application Ser. No. 14/511,848, filed Oct. 10, 2014, now U.S. Pat. No. 9,033,168, which is a divisional of U.S. patent application Ser. No. 11/749,501, filed May 16, 2007, now U.S. Pat. No. 8,857,637, which is a continuation-in-part of U.S. patent application Ser. No. 11/368,860, filed Mar. 6, 2006, now U.S. Pat. No. 7,708,159, all of which are incorporated herein by reference in their entirety.

TECHNICAL FIELD

The present invention relates to plastic containers, including injection molded and/or blow molded containers.

BACKGROUND

It is desirable to improve the stability of plastic containers and the handling of preforms that are used to form containers. At the same time, for economic and efficiency reasons, it is also desirable to provide containers and preforms that are suitable for their intended applications yet have a reduced weight.

SUMMARY

A plastic preform includes a hollow body portion including a closed base portion and a lower portion and a lower portion extending upwardly from the closed bottom portion; and a neck portion extending upwardly from the lower portion. The neck portion includes a dispensing opening positioned at a top of the neck portion, threads positioned below the dispensing opening, a tamper-evident formation having a lower surface and positioned directly below the threads, and a support flange having an upper surface and a lower surface and positioned below the tamper-evident formation. In an embodiment, the plastic preform is formed of a material comprising polyethylene terephthalate (PET), and a vertical distance from the lower surface of the tamper-evident formation to the lower surface of the support flange is from 0.125 to 0.150 inches. Containers and methods for molding preforms and making containers are also disclosed.

BRIEF DESCRIPTION OF THE DRAWINGS

Embodiments of the invention will now be described, by way of example, with reference to the accompanying drawings, wherein:

FIG. 1 is a front elevational view of a plastic container according to an embodiment of the invention.

FIG. 2 is a front elevation view of a preform according to another embodiment of the invention.

DETAILED DESCRIPTION

Figure 3:
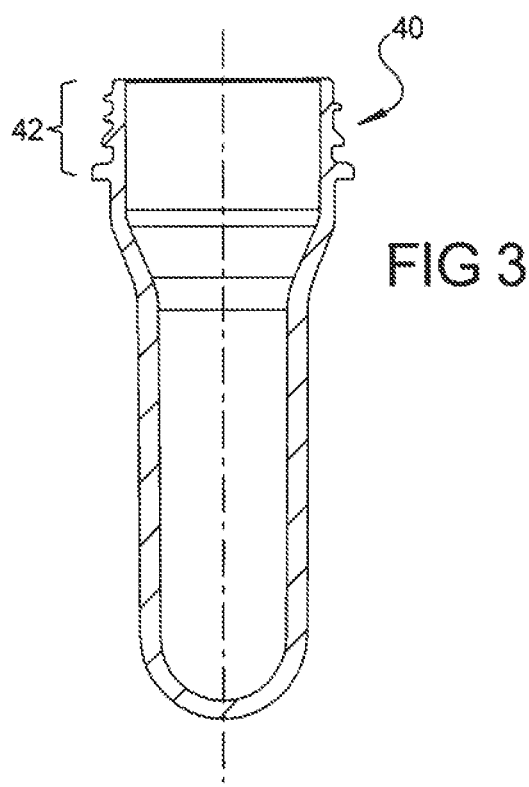
FIG. 3 is a cross-sectional view of a preform according to an embodiment of the invention.

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

A representative container 10 according to an embodiment of the present invention is generally shown in FIG. 1. Container 10 includes a lower supporting base portion 12, a sidewall portion 14, and a neck portion 16.

The sidewall portion may be cylindrical or non-cylindrical, and may include various formations, for example, without limitation, label panels, strengthening ribs, etc. The neck portion 16 includes a support flange 18 having an upper surface 20 and a lower surface 22. Support flange 18 is generally provided to facilitate the handling of containers, during formation and thereafter. Neck portion 16 further includes a tamper-evident formation 28 and a dispensing opening 24 positioned at, and formed by, the top of the neck portion 16. In an embodiment, the dispensing opening has an inner diameter that is at least 22 mm. However, the dispensing opening may be of various conventional or non-conventional sizes and may, for example, comprise a circular opening having an inner diameter from 22 mm to 29 mm.

Container 10 is comprised of plastic. In an embodiment, the container may be comprised of polymer, such as a polymer that provides good visual clarity when bi-axially oriented like polyethylene terephthalate (PET). However, the invention is not limited to a specific polymer, and containers and preforms that are provided according to the teachings of the present invention may be comprised of a wide number of polymers and/or blends, including those that included recycled material.

The tamper-evident formation 28, may be continuous, as generally illustrated, or may include one or more discontinuous formations. In other embodiments, the tamper-evident formation may comprise a formation (e.g., a lug or lugs) that extends from the upper and/or lower surface of the support ring. However, the invention is not limited to the illustrated means for indicating tampering and other means for indicating tampering, such as a covering (e.g., a foil covering) may be used instead of or in addition to other tamper-evident formations.

Embodiments of the container may additionally include a shoulder portion 15, a plurality of threads 26 for receiving a closure (not shown). Shoulder portion 15 may comprise an upper portion of the sidewall portion 14, and may extend inwardly into the neck portion 16, although many container configurations do not include a shoulder portion. A feature of containers according to embodiments of the present invention is a lowering of the center of gravity. For most configurations and applications, a lower center of gravity provides a container that is more stable and less likely to tip during manufacturing, processing, and/or handling. The center of gravity is the point at which if a body is suspended it would be perfectly balanced. For uniformly consistent, symmetrical bodies, the center of gravity is at the geometrical center. For non-consistent or non-symmetrical bodies, the center of gravity needs to be determined. Moreover, for purposes of the instant disclosure, the center of gravity is associated with preforms and with containers that are in an unfilled condition.

The center of gravity for container 10 illustrated in FIG. 1 is generally shown at 50. It is noted that for the instant container configuration, the center of gravity 50 is above the mid-height of the container due to the additional material, and hence weight, that is provided in the container finish portion—i.e., the neck portion 16. However, as described further herein, with a reduction in the vertical length and weight of the neck portion 16 (or elements thereof), the center of gravity for a container produced in accordance with the teachings of the present invention may have a center of gravity (e.g., 50) that is vertically lower than that of a container that employs a conventional (vertically longer and heavier) neck portion. For example, without limitation, the ratio of the vertical height of the center of gravity to the vertical height of the container may be less than 0.57. Notably, for some embodiments the ratio may be less than 0.53.

Additionally, in an embodiment of the invention, portions of the container—exclusive of the neck portion—may be stretched (e.g., in a stretch blow molding operation) to more than 3 times their initial (i.e., preform component) length in the axial direction.

As one would also expect, with a reduction in the vertical length and weight of the neck portion, the center of gravity for an associated preform will also be reduced when compared to an preform of like material and design below the neck portion that includes a longer vertical and heavier neck portion.

Figure 4:
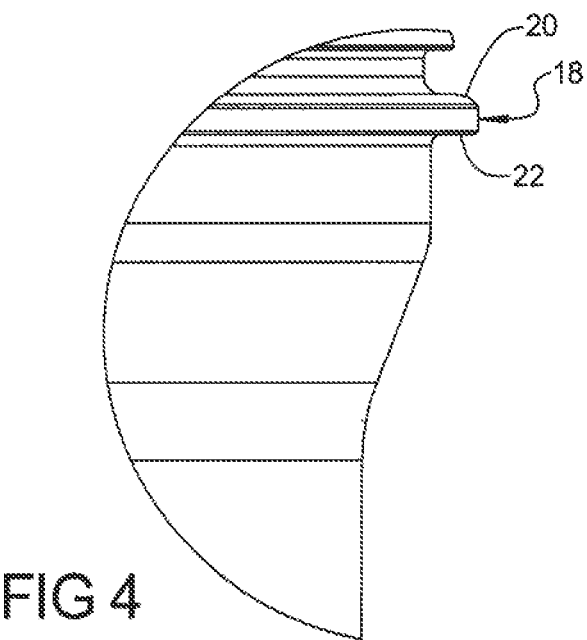
FIG. 4 is a partial enlarged view of the area illustrated in FIG. 2.

FIGS. 2 and 3 generally illustrate a preform 40 according to an embodiment of the invention. Preform 40 can, for instance, be used to form a wide variety of containers, including a container such as that illustrated in FIG. 1. By way of example, without limitation, preform 40 may be injection molded and/or blow molded, and may form an almost limitless number of container configurations. FIG. 4. depicts an enlarged portion of FIG. 2.

Preform 40 is also shown including a neck portion 42. For many applications, the neck portion provided in connection with a preform will remain substantially the same, and have substantially the same dimensions, as the neck portion of a molded container produced from the preform. Consequently, the neck portion 16 of the container 10 and the neck portion 42 of the preform may be substantially consistent, while the remaining portions of the preform and container—i.e., those below the respective neck portions—may change significantly. For ease of reference, common elements in the neck portion of the illustrated container and the neck portion of the illustrated preforms are provided with common reference numerals.

Figure 5:
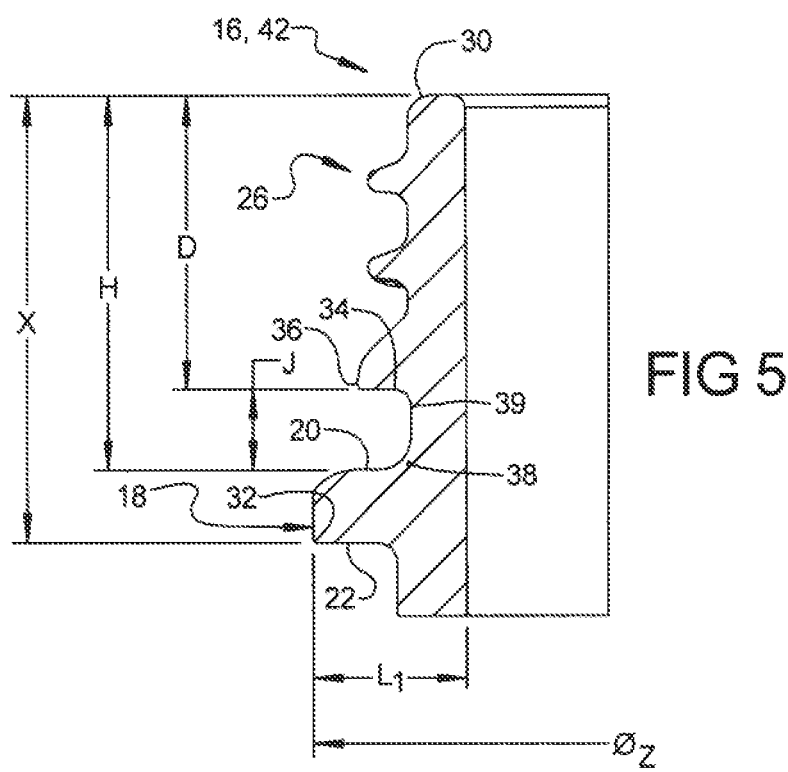
FIG. 5 is a partial cross sectional view of an upper portion of a container or preform according to an embodiment of the invention.

FIG. 5 illustrates a partial cross sectional view of an upper portion of a preform or a container formed from preform. In an embodiment, such as that generally illustrated, the vertical distance X from the top of the dispensing opening/neck portion (e.g., point 30) to the lower surface 22 of the support flange 18 (e.g., point 32) is 0.580 inches or less. For some embodiments, X may be 0.500 inches or less; for other embodiments, vertical distance X may be less than 0.450 inches.

Moreover, as generally illustrated, the vertical distance H from the top of the dispensing opening/neck portion (e.g., point 30) to the upper surface 20 of the support flange 18 may be 0.50 inches or less. For some embodiments, H may be 0.40 inches or less. Also, for some embodiments, the vertical distance D from the top of the dispensing opening/neck portion (e.g., point 30) to the lower surface of the tamper-evident formation (e.g., point 34) may be 0.30 inches or less.

In an embodiment, the vertical distance J from a furthest radially-extending portion of the lower surface of the tamper-evident formation 28 (e.g., point 36) to the upper surface 20 of the support flange 18, which generally equates to H minus D, may be 0.15 inches or less. For some embodiments, J may be 0.10 inches or less, and for other embodiments, vertical distance J may be less than 0.09 inches. For yet other embodiments, vertical distance J may be less than 0.08 inches.

Also, in an embodiment of the invention, the vertical distance between a furthest outwardly radially-extending portion of the lower surface of the tamper-evident formation (e.g., point 36) to the lower surface 22 of the support flange 18 at the same outward radial distance—which may generally equate or coincide with X minus D—is 0.20 inches or less, and for some embodiments may be 0.15 inches or less.

In an embodiment, support flange 18 has a radially extending length Li that is 0.20 inches or less. For some applications, length Li may be further reduced to 0.17 inches or less. With further reference to support flange 18, the angle—from horizontal—provided by a furthest outward radially extending portion of the lower surface 22 of support flange 18 (e.g., point 32) to the nearest radially-extending portion of the upper surface 20 of the support flange 18 is 16° or greater, and may be 20.0°±2°. However, for some embodiments, such as that generally depicted in FIG. 5, whereas a blending radius is provided to transition supporting flange 18 into an adjacent vertical portion of the neck (e.g., segment 39), the nearest radially-extending portion of the upper surface 20 of support flange 18 may be a theoretical position within supporting flange 18—e.g., point 38. Furthermore, for some embodiment, the least distance from a furthest radially-extending portion of the support flange (e.g., point 32) to the upper surface of the dispensing opening (e.g., at or about 30) is 0.60 inches or less, and for some neck portions may be 0.50 inches or less.

Embodiments of preforms and containers may have a neck portion that weighs 3.0 grams or less. For some embodiments, the weight of the neck portion can be 2.3 grams or less. Further, for a 500 ml version of a container made in accordance with an embodiment of the invention, the total weight of the preform and an unfilled weight of a container produced from such a preform may be 11 grams or less, and for some embodiments may be 10 grams or less. Of course, for many embodiments, without limitation, the preform and resulting container will weigh at least 9 grams.

By providing a neck portion 16 for a container 10 that incorporates one or more aspects of the foregoing embodiments, the center of gravity (see, e.g., 50 in FIG. 1) for the container may be lowered. For e.g., for a 500 ml container of with a configuration as generally shown in FIG. 1, the weight of the neck portion may be reduced from a conventional 3.4 to 2.0 g. Based on such a reduction in weight, the center of gravity (see, e.g., 50) may become at least about 0.48 inches lower than that provided for a similarly configured container having a 3.4 g finish—and will likely be about 0.48 and 0.58 inches lower than with the heavier (e.g., 3.4 g) conventional finish. Providing a neck portion in accordance with embodiments disclosed herein for such a container can provide a lowering of center of gravity as a percentage of height from bottom that ranged from about 4.5% to about 6% when compared to a similar container with a conventional 3.4 g neck portion. Moreover, when a container such as that discussed in this paragraph (e.g., 2.0 g neck portion/finish) is compared to a conventional container (e.g. 3.4 g neck portion/finish), the calculations provide a drop or lowering in center of gravity that provides an approximately 10.5% to 12.2% relative percent change (i.e., percent improvement).

It is noted that in addition to the material and economic benefits that may be achieved by "light-weighting" and lowering a comparative center of gravity in a resultant container, a lowering in the center of gravity of a preform may also provide certain manufacturing benefits. For example, without limitation, a preform with a comparatively lower center of gravity may provide for improved sorting and/or handling during production and manufacturing. That is, among other things, a preform with a lower center of gravity can provide for comparatively more stable or improved retention and processing. Similarly, a container with a lower center of gravity may exhibit improved handling, for instance, without limitation, in connection with de-palletizing or with "table top" conveying systems. Further, a lower center of gravity can provide a container, filled or unfilled, with improved stability. It is further noted, however, that the present invention is not limited to containers that are blown and filled in distinct or separate operations. That is, without limitation, preforms and containers provided in accordance with the teachings of the present invention also lend themselves for use in connection with various conventional "blow-and-fill" operations, including those in which a container is filled just after formation (e.g., within seconds of formation) in close proximity to where the container is formed. The operation comprising the blow-and-fill may be a single, integrated machine, or may be comprised of two or more separate devices that are adjacent or in close proximity to one another.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. A method for injection molding a plastic preform, the plastic preform comprising:
   a hollow body portion, comprising:
      a closed bottom portion; and
      a lower portion extending upwardly from the closed bottom portion; and
   a neck portion extending upwardly from the lower portion, the neck portion including:
      a dispensing opening positioned at a top of the neck portion;
      threads positioned below the dispensing opening;
      a tamper-evident formation positioned directly below the threads, the tamper-evident formation having a lower surface; and
      a support flange positioned below the tamper-evident formation, the support flange having an upper surface and a lower surface;
   wherein the plastic preform is formed of a material comprising polyethylene terephthalate (PET); and a vertical distance from the lower surface of the support flange to the top of the neck portion is from 0.425 to 0.500 inches.

2. The method according to claim 1, wherein a vertical distance from the top of the neck portion to a lower surface of the tamper-evident formation is from 0.30 to 0.31 inches.

3. The method according to claim 1, wherein a vertical distance from the top of the neck portion to a lower surface of the tamper-evident formation is about 0.31 inches.

4. The method according to claim 1, wherein a vertical distance from the lower surface of the tamper-evident formation to the lower surface of the support flange is from 0.125 to 0.150 inches.

5. The method according to claim 1, wherein a vertical distance from the lower surface of the support flange to the top of the neck portion is from 0.435 to 0.500 inches.

6. The method according to claim 1, wherein a vertical distance from the lower surface of the support flange to the top of the neck portion is from 0.425 to 0.450 inches.

7. The method according to claim 1, wherein a vertical distance from the lower surface of the support flange to the top of the neck portion is from 0.450 to 0.500 inches.

8. The method according to claim 1, wherein the threads comprise non-vented threads.

9. The method according to claim 1, wherein the threads comprise multiple-lead threads.

10. The method according to claim 1, wherein a vertical distance from the upper surface of the support flange to the top of the neck portion is from 0.40 to 0.50 inches.

11. A method for injection molding a plastic preform, the plastic preform comprising:
   a hollow body portion, comprising:
      a closed bottom portion; and
      a lower portion extending upwardly from the closed bottom portion; and
   a neck portion extending upwardly from the lower portion, the neck portion including:
      a dispensing opening positioned at a top of the neck portion;
      threads positioned below the dispensing opening;
      a tamper-evident formation positioned below the threads, the tamper-evident formation having a lower surface; and
      a support flange positioned below the tamper-evident formation, the support flange having an upper surface and a lower surface;

wherein the plastic preform is formed of a material comprising polyethylene terephthalate (PET); a vertical distance from the lower surface of the support flange to the top of the neck portion is from 0.425 to 0.500 inches; and an outside diameter of the support flange is greater than 22 mm and less than or equal to 39.2 mm.

12. The method according to claim 11, wherein a vertical distance from the lower surface of the tamper-evident formation to the upper surface of the support flange is from 0.08 to 0.09 inches.

13. The method according to claim 11, wherein a vertical distance from the lower surface of the support flange to the top of the neck portion is from 0.435 to 0.500 inches.

14. The method according to claim 11, wherein a vertical distance from the lower surface of the support flange to the top of the neck portion is from 0.425 to 0.450 inches.

15. The method according to claim 11, wherein a vertical distance from the lower surface of the support flange to the top of the neck portion is from 0.450 to 0.500 inches.

16. The method according to claim 11, wherein the threads comprise non-vented threads.

17. The method according to claim 11, wherein the threads comprise multiple-lead threads.

18. The method according to claim 11, wherein a vertical distance from the top of the neck portion to a lower surface of the tamper-evident formation is about 0.31 inches.

19. The method according to claim 11, wherein a vertical distance from the upper surface of the support flange to the top of the neck portion is from 0.40 to 0.50 inches.

20. The method according to claim 11, a vertical distance from the lower surface of the tamper-evident formation to the lower surface of the support flange is from 0.125 to 0.150 inches.

21. A method for injection molding a plastic preform, the plastic preform comprising:
    a hollow body portion, comprising:
        a closed bottom portion; and
        a lower portion extending upwardly from the closed bottom portion; and
    a neck portion extending upwardly from the lower portion, the neck portion including:
        a dispensing opening positioned at a top of the neck portion;
        threads positioned below the dispensing opening;
        a tamper-evident formation positioned directly below the threads, the tamper-evident formation having a lower surface; and
        a support flange positioned below the tamper-evident formation, the support flange having an upper surface and a lower surface;
    wherein the plastic preform is formed of a material comprising polyethylene terephthalate (PET) and includes recycled material; an outside diameter of the support flange is greater than 22 mm and less than or equal to 39.2 mm; a vertical distance from the lower surface of the support flange to the top of the neck portion is from 0.425 to 0.500 inches; and a vertical distance from the lower surface of the tamper-evident formation to the upper surface of the support flange is from 0.08 to 0.09 inches.

22. The method according to claim 21, wherein a vertical distance from the top of the neck portion to a lower surface of the tamper-evident formation is about 0.31 inches.

23. The method according to claim 21, wherein a vertical distance from the lower surface of the tamper-evident formation to the lower surface of the support flange is about 0.125 inches.

24. A method for injection molding a plastic preform, the plastic preform comprising:
    a hollow body portion, comprising:
        a closed bottom portion; and
        a lower portion extending upwardly from the closed bottom portion; and
    a neck portion extending upwardly from the lower portion, the neck portion including:
        a dispensing opening positioned at a top of the neck portion;
        threads positioned below the dispensing opening;
        a tamper-evident formation positioned below the threads, the tamper-evident formation having a lower surface; and
        a support flange positioned below the tamper-evident formation, the support flange having an upper surface and a lower surface;
    wherein the plastic preform is formed of a material comprising polyethylene terephthalate (PET); a vertical distance from the lower surface of the support flange to the top of the neck portion is from 0.425 to 0.450 inches.

* * * * *